United States Patent [19]

Busquets

[11] 4,333,497
[45] Jun. 8, 1982

[54] FAUCET ASSEMBLY WITH MIXING VALVE

[76] Inventor: Agustin A. Busquets, 6211 Pinetree Dr., Utica, Mich. 48087

[21] Appl. No.: 83,001

[22] Filed: Oct. 9, 1979

[51] Int. Cl.³ ............................................. F16K 11/02
[52] U.S. Cl. ........................... 137/625.17; 137/636.1; 137/636.2; 137/539; 137/625.41
[58] Field of Search ............ 137/625.17, 636.2, 636.4, 137/625.41, 625.4, 636.1, 636.3, 539

[56] References Cited

U.S. PATENT DOCUMENTS

| | | | |
|---|---|---|---|
| 2,890,720 | 6/1959 | Moen | 137/636.2 |
| 3,335,750 | 8/1967 | Kepner | 137/539 X |
| 3,542,155 | 11/1970 | Kern | 137/539 X |
| 3,807,453 | 4/1974 | Dom et al. | 137/625.17 |
| 3,835,887 | 9/1974 | Mongerson et al. | 137/625.17 X |
| 3,991,427 | 11/1976 | Kemker | 137/625.17 |
| 4,226,260 | 10/1980 | Schmitt | 137/625.17 X |

Primary Examiner—William R. Cline
Attorney, Agent, or Firm—Reising, Ethington, Barnard, Perry & Brooks

[57] ABSTRACT

An improved faucet assembly having a cam actuated mixing control valve is disclosed. The assembly includes a housing having an interior bore defined by an inner wall portion having a pair of circumferentially spaced inlets and a pair of outlets. A control valve is slidably mounted in the bore so that the control valve can rotate and move in an axial direction therein. The valve includes a cylindrical portion having two circumferentially spaced passages formed therethrough and extending into an inner mixing chamber within the bore. The valve includes a pair of spaced elongated wall portions integrally formed with the control valve within the bore. An actuating assembly is operatively connected to the valve to move the valve in an axial direction and to rotate the valve in the bore. The actuating assembly includes an elongated control stem rotatably mounted within the mixing chamber and which has an eccentrically mounted actuating cam portion disposed between the elongated wall portion for engagement therewith. A pair of axially spaced retaining shoulders mounted on the control stem retain the valve at the ends of the elongated wall portions so that the valve moves with the stem in an axial direction. The outer surface of the eccentrically mounted cam portion engages the elongated wall portions to rotatably move the valve in the bore when the stem is rotated about its longitudinal axis.

17 Claims, 10 Drawing Figures

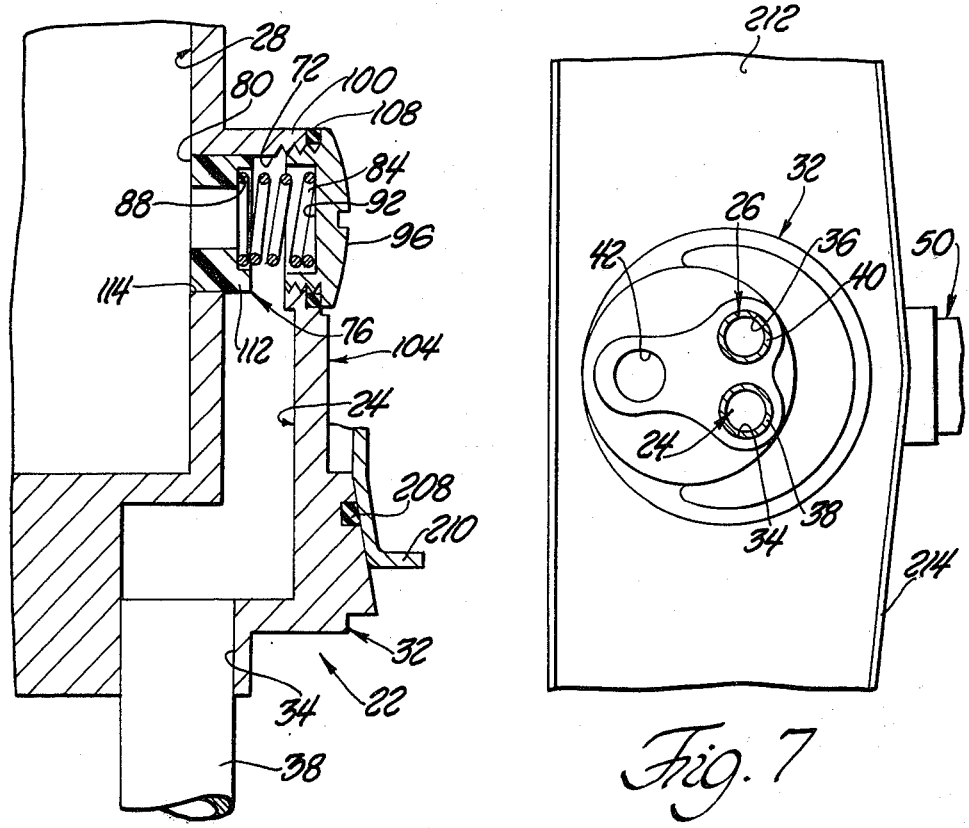
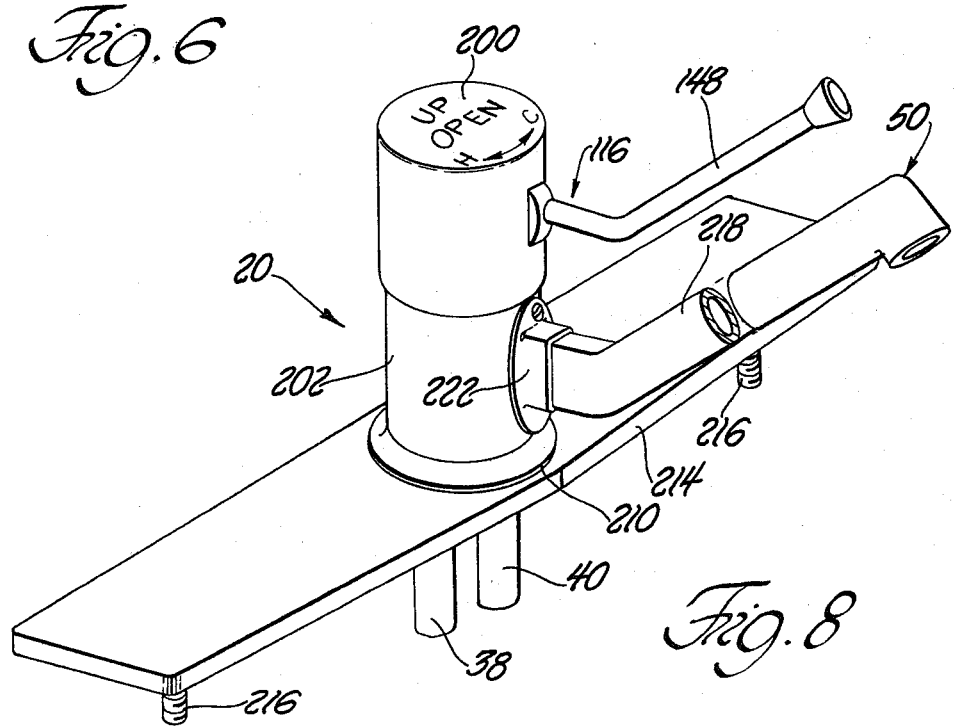

FAUCET ASSEMBLY WITH MIXING VALVE

TECHNICAL FIELD

This invention relates to mixing faucets and in particular to mixing faucets which have a mixing valve for mixing hot and cold water therein.

BACKGROUND ART

Prior patents disclose mixing faucets having a mixing valve for use in a hot and cold water faucet having many different arrangements and cooperative interrelationships. For example, the U.S. patent to Mongerson et al U.S. Pat. No. 3,835,887 discloses a mixing valve including a body member having inlet passages terminating on the exterior thereof in spaced relation. A cam-like surface is in contact with the exterior of a sleeve within a recess. Triangular passages control the volume and ratio of mixing of the hot and cold water.

Likewise the U.S. patent of Moen U.S. Pat. No. 2,890,720 discloses a mixing faucet having a single valve mechanism. The control valve is defined by two concentric circumferences that form a wall of constant thickness. The control valve is split and applied within a cylinder under compression to cause it to automatically maintain a sliding fit of desired closeness with the cylinder.

The U.S. patent of Dom et al U.S. Pat. No. 3,807,453 discloses a mixing faucet comprising a one-piece valve body and a spindle valve member. A resilient seal assembly including spring abutment plugs is provided, the plugs being accessible.

Other faucet assemblies generally of the type to which this invention relates are disclosed by Argentinian Pat. No. 126,387 and the U.S. patents of Bauberger U.S. Pat. No. 2,490,726, Moen U.S. Pat. No. 2,757,687, Moen U.S. Pat. No. 2,949,933, Page U.S. Pat. No. 2,987,079, Moen 3,788,356, Knapp 3,943,970 and Palmer 4,010,772.

DISCLOSURE OF THE INVENTION

An object of the present invention is to provide a mixing faucet assembly having a single mixing valve which is inexpensive to manufacture and easily assembled.

Another object of this invention is to provide a faucet assembly having a single mixing valve and having a camming surface which completely controls the ratio of the mixing and which reduces the transverse travel of an actuating assembly.

A further object of the invention is to provide a mixing faucet assembly having a control valve having eccentric inner and outer wall surfaces forming a wall of variable thickness.

Yet another object of the present invention is to provide a mixing faucet assembly including a control valve having longitudinal parallel guide members for housing a cylindrical eccentric part of a camshaft wherein the control valve and the camshaft are rotated by an actuating assembly connected to the camshaft.

In carrying out the above objects and other objects of this invention, a preferred embodiment of the invention which is adapted for connection with two pipes for mixing the contents flowing in the pipes, includes a housing having a curved interior bore defined by an inner wall portion having a pair of circumferentially spaced inlets and at least one outlet. The assembly also includes a control valve slidably mounted in the bore so that the control valve can rotate and move in an axial direction therein. The valve includes a cylindrical portion having two circumferentially spaced passages formed therethrough and which extend into an inner mixing chamber. The valve also includes a pair of spaced guide members connected to the cylindrical portion within the mixing chamber. Also included is an actuating means operatively connected to the valve to move the valve in an axial direction and to rotate the valve within the bore. The actuating means includes an elongated control stem rotatably mounted within the mixing chamber and has an eccentrically mounted actuating cam portion disposed between the guide members for engagement therewith. A securing means secures the control stem to the valve so that the valve moves with the stem in an axial direction and wherein the outer surface of the eccentrically mounted cam portion engages the guide members to rotatably move the valve in the bore when the cam is rotated about its longitudinal axis.

The objects, features and advantages of the present invention are readily apparent from the following detailed description of the best mode taken in connection with the accompanying drawings.

BRIEF DESCRIPTION OF THE DRAWINGS

FIG. 6 is a sectional view partially broken away of the assembly with the control valve removed;

FIG. 7 is a sectional view partially broken away taken along line 7—7 of FIG. 1;

FIG. 8 is a perspective view partially broken away of a first embodiment of the faucet assembly;

BEST MODE FOR CARRYING OUT THE INVENTION

Figure 1:
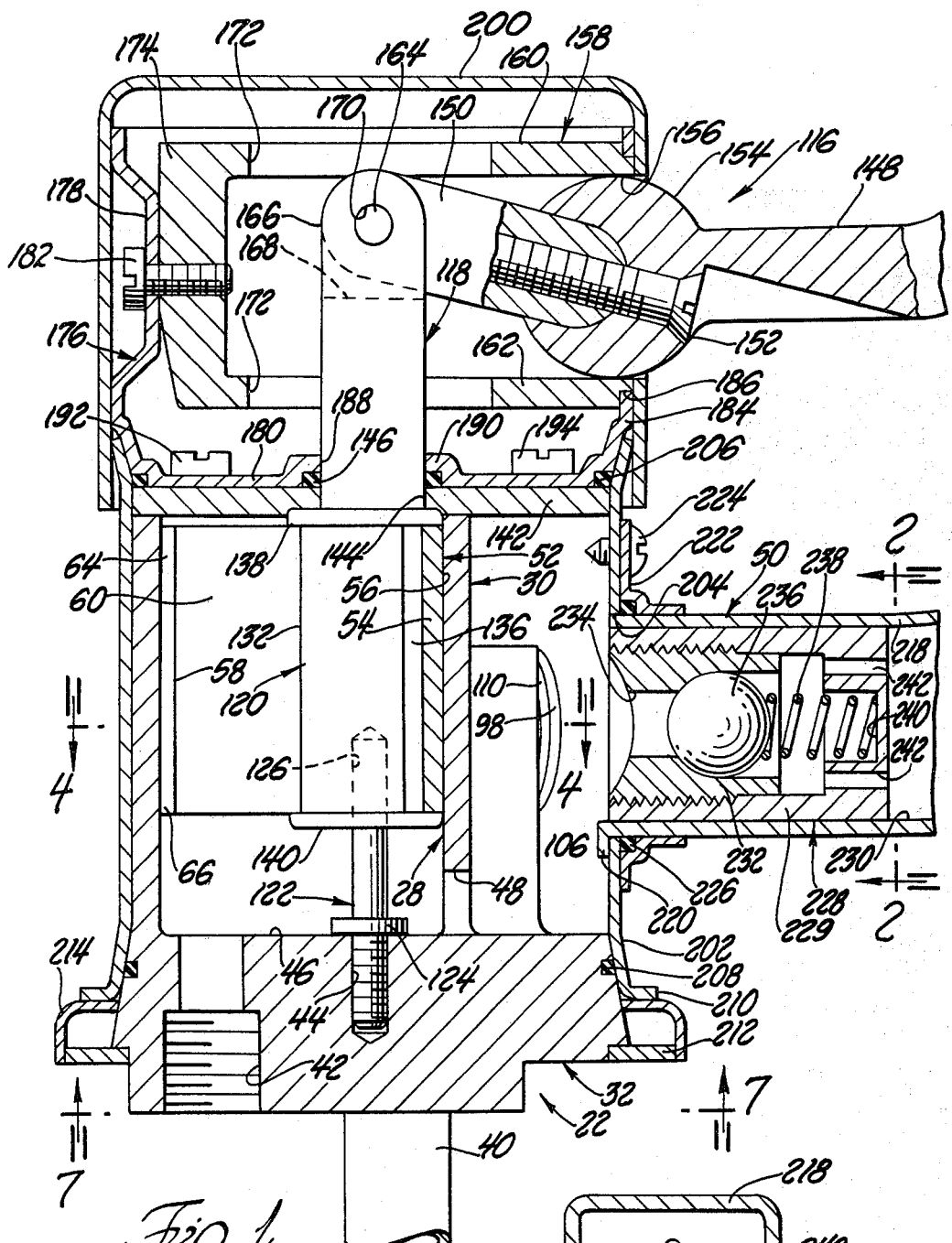
FIG. 1 is a sectional view partially broken away which shows a faucet assembly constructed according to the invention.

Referring now to the drawings, there are shown two illustrative embodiments of the invention, two faucet assemblies especially adapted for connection with two pipes for mixing the contents of the pipe and particularly for mixing hot and cold water.

Referring to FIG. 8, the faucet assembly constructed according to a first embodiment of the present invention is indicated collectively by reference numeral 20.

Referring to FIGS. 1, 6 and 7, the assembly 20 includes a housing generally indicated at 22 having a pair of water inlets generally indicated at 24 and 26 for providing hot and cold water, respectively, into a bore generally indicated at 28 defined by a cylindrical inner wall portion generally indicated at 30 of the housing 22. The inner wall portion 30 is integrally formed with a base portion generally indicated at 32 of the housing 22, such as by die casting.

The hot and cold water inlets 24 and 26 include hot and cold water inlet openings 34 and 36, respectively. The ends of hot and cold water supply pipes 38 and 40, respectively, are inserted and fixedly mounted within their corresponding openings 34 and 36 such as by brazing to effect leak-proof connections to the base portion 32.

The base portion 32 also includes a threaded hole 42 which communicates the bore 28 with the outer surface of the base portion 32. The hole 42 is threaded to receive a spray attachment unit (not shown).

The base portion 32 also includes a threaded aperture 44 which communicates with the bore 28 and which extends inwardly into the base portion 22 from the top surface 46 of the base portion 32 which will be described in greater detail hereinafter.

The wall portion 30 of the housing 22 also includes a water outlet 48 for communicating the bore 28 with a spout assembly generally indicated at 50 which also will be described in greater detail hereinafter.

Figure 3:
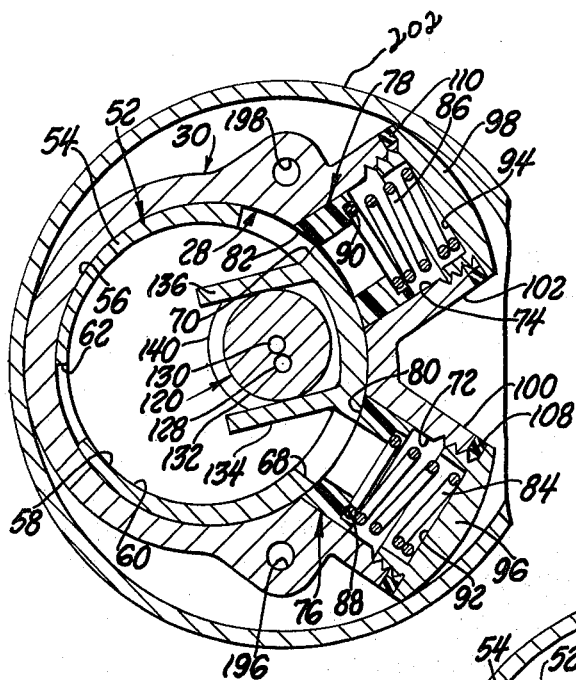
FIG. 3 is a sectional view of the assembly taken along line 4—4 of FIG. 1 with the interior control valve rotated slightly in a counterclockwise direction and moved into its lowermost position.
Figure 4:
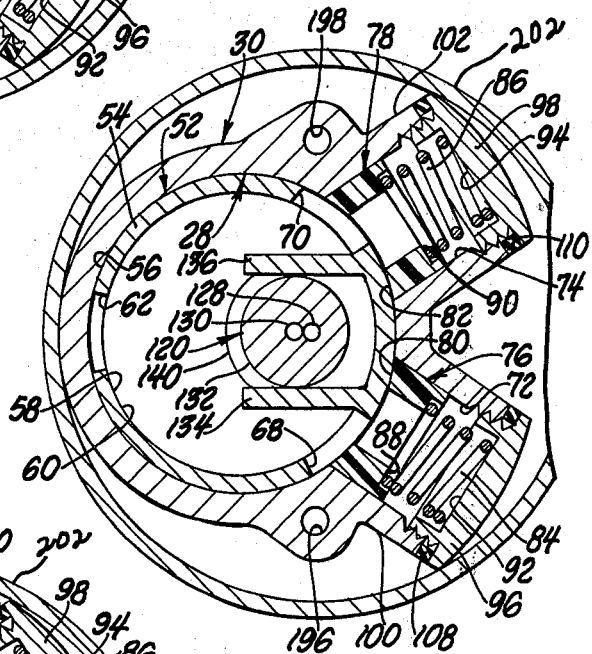
FIG. 4 is a sectional view partially broken away of the assembly taken along line 4—4 of FIG. 1 with the control valve in its lowermost position.
Figure 5:
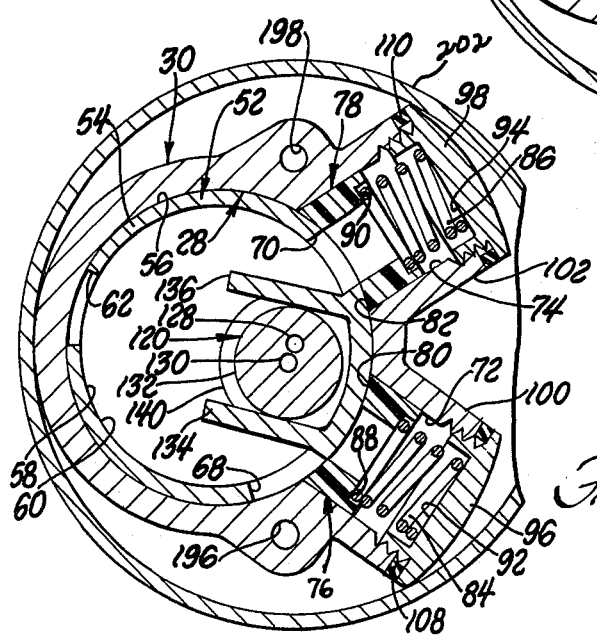
FIG. 5 is a sectional view partially broken away of the assembly taken along line 4—4 of FIG. 1 with the interior control valve rotated slightly in a clockwise direction and moved into its lowermost position.

The faucet assembly 20 also includes a control valve generally indicated at 52 which is slidably mounted in the bore 28 so that the control valve 52 can rotate and move in an axial direction therein. The control valve 52 includes a cylindrical portion or integral sleeve 54. The sleeve 54 has a curved outer surface 56 and an eccentrically formed inner surface 58 which defines an inner mixing chamber 60. Because of the eccentricity of the outer and inner surfaces 56 and 58 respectively, the sleeve 54 has a variable thickness as best shown in FIGS. 3–5. Because the sleeve 54 is of a variable thickness, the control valve 52 is allowed to expand within the bore 28 in such a way that the pressure exerted by the sleeve 54 at its outer surface 56 against the inner wall portion 30 of the housing 22 is substantially uniform.

The sleeve 54 has a longitudinal slit 62 extending completely therethrough from the top portion 64 of the sleeve 54 to the bottom portion 66 of the sleeve 54. The slit 62 allows for the easy insertion of the control valve 52 within the bore 28 by allowing the control valve 52 to be mounted within the bore 28 with a light press fit. The slit 62 also prevents the sleeve 54 from fitting too tightly within the bore 28 due to circulating hot water, and to compensate for control valve wear.

The sleeve 54 also includes a pair of circumferentially spaced hot and cold water passages 68 and 70, respectively, which are disposed in the same transverse plane for alignment with corresponding radially-extending end portions 72 and 74 of the hot and cold water inlets 24 and 26, respectively. The end portions 72 and 74 are also disposed in the same transverse plane. The passages 68 and 70 selectively communicate the hot and cold water inlets 24 and 26 with the mixing chamber 60 as will be described in greater detail hereinafter.

Disposed within the end portions 72 and 74 of the hot and cold water inlets 24 and 26 are axially biased cylindrical seals generally indicated at 76 and 78, respectively. The seals 76 and 78 are made of any suitable resilient material such as neoprene. The seals 76 and 78 have cup-shaped, inwardly facing surfaces 80 and 82, respectively, which slidably engage the outer curved surface 56 of the sleeve 54 which surface 56 may be micropolished to lengthen the life of the seals 76 and 78.

The seals 76 and 78 are biased within their respective end portions 72 and 74 of the hot and cold water inlets 24 and 26, respectively, by biasing springs 84 and 86, respectively. First ends of the springs 84 and 86 engage shoulder portions 88 and 90 of the seals 76 and 78. Second ends of the springs 84 and 86 are disposed within recesses 92 and 94 of threaded plugs 96 and 98, respectively, which define the ends of the end portions 72 and 74 of the hot and cold water inlets 24 and 26, respectively.

The plugs 96 and 98 are threadedly and removably attached to threaded upper portions 100 and 102 of bosses generally indicated at 104 and 106, respectively, through which the hot and cold water inlets 24 and 26 extend, respectively. O-rings 108 and 110 seal the end portions 72 and 74 of the hot and cold water inlets 24 and 26.

The identical seals 76 and 78 include axial key portions 112 (only one of which is shown) as shown in FIG. 6. The key portions 112 fit in grooves 114 of the end portions 72 and 74 (only one of which is shown) in order to locate and facilitate the installation of the seals 76 and 78.

Referring now to FIG. 1, the assembly 20 also includes an actuating means or an actuating assembly generally indicated at 116 which is operatively connected to the control valve 52 to move the control valve 52 in an axial direction and to rotate the control valve 52 within the bore 28 as will now be described in greater detail.

The actuating assembly 116 includes an elongated control stem or shaft generally indicated at 118. The control shaft 118 includes an eccentric actuating cam portion 120 integrally formed with the control shaft 118. The shaft 118 is rotatably and slidably mounted within the mixing chamber 60 on a threaded pin 122 which, in turn, is threadedly mounted within the threaded aperture 44. The pin includes a shoulder portion 124 which engages the top surface 46 of the base portion 32 to prevent the further movement of the pin 122 into the threaded aperture 44. The shoulder portion 124 also serves as a lowermost stop for the control valve 52 as will be described in greater detail hereinafter.

The pin 122 extends into and is slidably mounted within a slot 126 (shown by phantom lines in FIG. 1) which is concentrically formed along the longitudinal axis of the shaft 118. The slot 126 is off-center or eccentric with respect to the longitudinal axis of the cam portion 120.

With reference to FIGS. 3 through 5, for illustrative purposes, a center portion of the shaft 118 is indicated at 128 while a center portion of the cam portion 120 is indicated at 130. The outer surface 132 of the cam portion 120 slidably engages and is disposed between a pair of elongated wall portions 134 and 136 which are integrally formed with the sleeve 54 and which extend along the longitudinal axis of the sleeve 54 between the top and bottom portions 64 and 66 of the sleeve 54 as best shown in FIG. 1.

FIGS. 3–5 are sectional views of FIG. 1 wherein the control valve 52 is in its lowermost position within the bore 28. The control valve 52 is shown in three different mixing positions with respect to the inner wall portion 30 of the housing 22. In FIG. 4 approximately equal amounts of hot and cold water will flow through the hot and cold water inlets 24 and 26, respectively, and into the mixing chamber 60 to be mixed therein. Referring to FIG. 3, the shaft 118 has been rotated in a clockwise direction from the position shown in FIG. 4 such that the outer surface 132 of the cam portion 120 slidably engages the wall portion 136 to move the sleeve 54 in a counterclockwise direction with respect to FIG. 4 so as to close the cold water inlet 26 and fully open the hot water inlet 24.

Referring to FIG. 5, the shaft 118 is rotated in a counterclockwise direction with respect to the position shown in FIG. 4 and the outer surface 132 of the cam portion 120 engages the wall portion 134 so as to rotate the sleeve 54 in a clockwise direction with respect to the position shown in FIG. 4 so as to close the hot water inlet 24 and thereby allowing only cold water to flow from the cold water inlet 26 into the mixing chamber 60.

The assembly 20 also includes securing means or a pair of retaining flanges or shoulders 138 and 140. The shoulders 138 and 140 are preferably integrally formed with the shaft 118 and receive the sleeve 54 therebetween at the end surfaces of the top and bottom portions 64 and 66, respectively. The shoulders 138 and 140 secure the shaft 118 to the control valve 52 so that the control valve 52 moves with the shaft 118 in an axial direction to thereby place the circular hot and cold water passages 68 and 70, respectively, in fluid communication with the hot and cold water inlets 24 and 26 by placing the hot and cold water passages 68 and 70 in the same transverse plane as their respective end portions 72 and 74.

Referring again to FIG. 1, the housing 22 also includes a valve lid 142 which overlies the inner wall portion 30 of the housing 22. The valve lid 142 has an aperture 144 extending completely therethrough. The shaft 118 extends through the aperture 144 and is slidably and rotatably mounted therein. The shaft 118 is sealed within the aperture 144 by an O-ring 146.

As shown in FIG. 1, the actuating assembly 116 comprises a fulcrum lever assembly. The assembly 116 includes a handle part 148 and an actuating link 150 which are secured together by a screw at a cylindrical portion 154 of the handle part 148. The cylindrical portion 154 of the handle part 148 is rotatably disposed within an opening 156 of a fulcrum member generally indicated at 158 between upper and lower flanges 160 and 162 thereof.

The actuating link 150 is pivotally connected to the shaft 118 by a pin 164 which extends through an end portion of the actuating link 150 and a pair of spaced flange members 166 (only one of which is shown) which are integrally formed at the end of the shaft 118. The end portion of the actuating link 150 is disposed between the flange members 166 in a slot 168 defined by the two flange members 166. The pin 164 extends through a transverse hole 170 formed through the flanges 166 and through a passage (not shown) which extends through the actuating link 150 at its end portion. The shaft 118 extends through an aperture 172 formed through the upper and lower flanges 160 and 162 which are integrally formed together with an interconnecting side wall 174.

The housing 22 also includes a fulcrum support member generally indicated at 176 which includes a cylindrical side portion 178 and an integrally formed bottom portion 180. The fulcrum member 158 is supported by the support member 176 by a screw 182 which extends through the cylindrical side portion 178 and into the side wall 174 and is also supported by upwardly extending flange 184 of the cylindrical side portion 178 which engages the front portion of the lower flange 162 within a groove 186.

The shaft 118 extends through a hole 188 formed through a raised portion 190 of the bottom portion 180. The O-ring 146 also seals the shaft 118 within the hole 188.

The bottom portion 180 of the support member 176 is secured to the valve lid 142 and to the bosses 104 and 106 of the inner wall portion 30 by a pair of threaded screws 192 and 194. As shown in FIG. 1, the threaded screws 192 and 194 are shown approximately 90 degrees out of their true position for illustrative purposes. The screws 192 and 194 extend through the bottom portion 180 and the valve lid 142 and are received within threaded holes 196 and 198 formed in the bosses 104 and 106 which extend upwardly and abut against the bottom surface of the valve lid 142. The screws 192 and 194 thereby secure the support member 176, the valve lid 142 and the inner wall portion 30 together.

The housing 22 also includes an upper rotatable cover 200 which has on its top outer surface a series of spaced indicia indicating different operating positions of the handle part 148.

The housing 22 also includes a lower cylindrical portion 202 having an opening 204 formed therethrough to receive the spout assembly 50. An O-ring 206 seals the cylindrical portion 202 with the lid 142 and the bottom portion 180 of the support member 176. An O-ring 208 seals the base portion 32 with respect to an outwardly extending flange portion 210 of the cylindrical portion 202.

The assembly 20 also includes a support plate or member 212 which is fixedly secured to the base portion 32 such as by welding and which is also fixedly secured to a cover 214. The cover 214, in turn, is fixedly secured to the cylindrical portion 202 at the flange portion 210. As shown in FIG. 8, the support plate 212 is provided with securing means or screws 216, nuts (not shown) and washers (not shown) for mounting the plate 212 and the housing 22 to a support surface.

Figure 2:
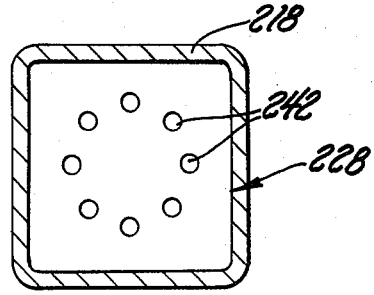
FIG. 2 is a sectional view of the assembly taken along line 2—2 of FIG. 1.

Referring to FIGS. 1, 2 and 8 the spout assembly 50 includes an elongated spout 218 which is disposed at one end thereof within the opening 204 and held therein by the retaining flange 220. The spout 218 is also held within the opening 204 by an apertured flange part 222 of the spout assembly 50. The flange part 222 is fixedly secured to the cylindrical portion 202 at its upper portion by a screw 224. An O-ring 226 seals the spout 218 within the opening 204.

The spout assembly 50 also includes a diverter valve assembly generally indicated at 228 which is press-fitted within an outlet passage 230 extending through the spout 218. The diverter valve assembly 228 includes a diverter body 229 which is threadedly connected to a threaded plug 232 of the assembly 228 having an aperture 234 extending therethrough and which is normally closed by a ball 236 which is biased by a spring 238 which extends between the ball and a recess 240 formed at an interior surface of the diverter body 229. The diverter body 229 also includes a plurality of outlet holes 242 to allow water mixed within the mixing chamber 60 to flow through the spout 218 when pressure within the mixing chamber 60 is sufficient to move the ball 236 against the bias of the spring 238 to thereby open the aperture 234 for fluid movement therethrough.

FIGS. 1 and 8 show the control valve 52 in its "off" position. If the handle part 148 is moved in an upwardly direction, the shaft 118 moves down together with the control valve 52 and fluid communication is established between the hot and cold water inlets 24 and 26 and the hot and cold water passages 68 and 70, respectively, as shown in FIG. 4. When the handle part 148 is moved in a clockwise direction as shown in FIG. 8 the control valve 52 is actuated by the eccentrically mounted cam portion 120 so that the sleeve 54 rotates in a counterclockwise direction thereby increasing the amount of hot water flowing into the mixing chamber 60 and decreasing the amount of cold water flowing into the mixing chamber 60 until the sleeve 54 reaches the position shown in FIG. 3 wherein the hot water inlet 24 fully communicates with the hot water passage 68 and wherein the cold water inlet 26 is closed by the curved outer surface 56 of the sleeve 54.

If the handle part 148 is moved in a counterclockwise direction from the position shown in FIG. 8 after the handle part 148 is moved upwardly, the actuated control valve 52 rotates in a clockwise direction such that the amount of cold water increases and the amount of hot water decreases until the sleeve 54 reaches the position shown in FIG. 5 wherein the cold water inlet 26 fully communicates with the cold water passage 70 and the hot water inlet 26 is fully closed by the curved outer surface 56 of the sleeve 54.

Different volumes and temperatures of water can be obtained by partially moving the handle part 148 upwardly and downwardly and by rotating the handle part 148 more or less from the center position shown in FIG. 8. In any case, the mixed water passes through the outlet 48, through the aperture 234, past the biased ball 36 and exits from the spout 218. If the spray hose (not shown) is placed in an open position to allow water to flow therethrough, the aperture 234 is restricted by the ball 236 as biased by the spring 238 so that the mixed water exits through the hole 42 and through a spray head of the spray hose.

Figure 9:
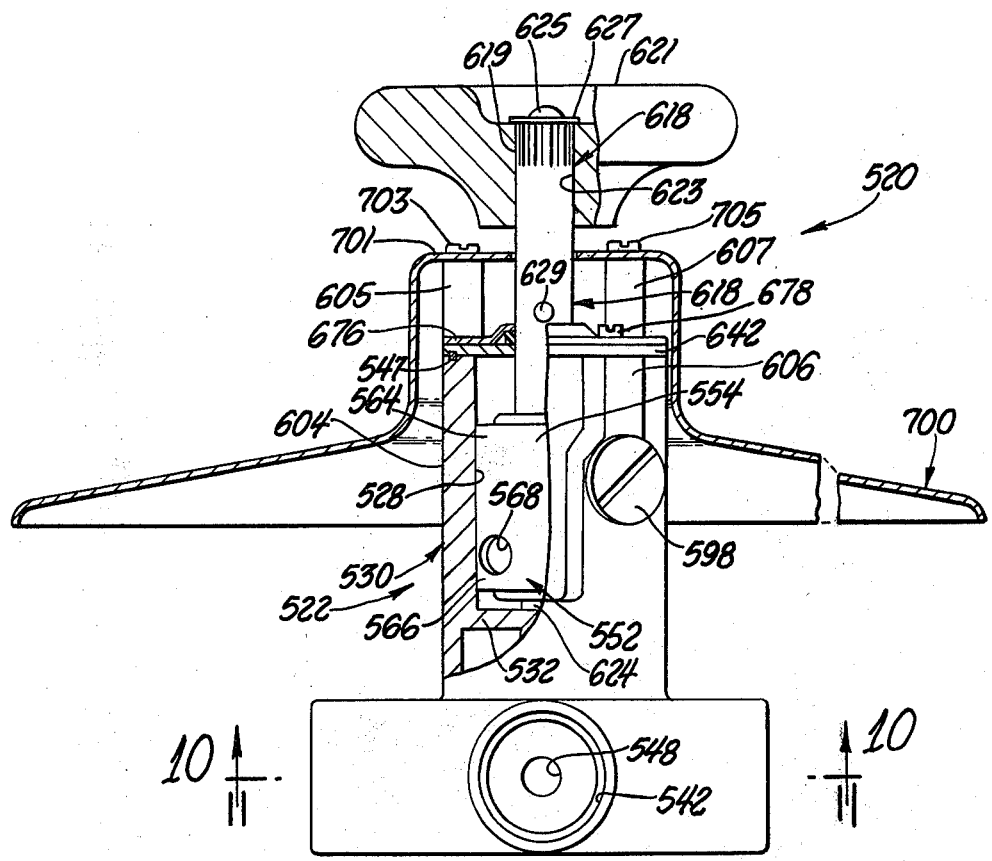
FIG. 9 is a sectional view partially broken away of a second embodiment of the faucet assembly constructed according to this invention.
Figure 10:
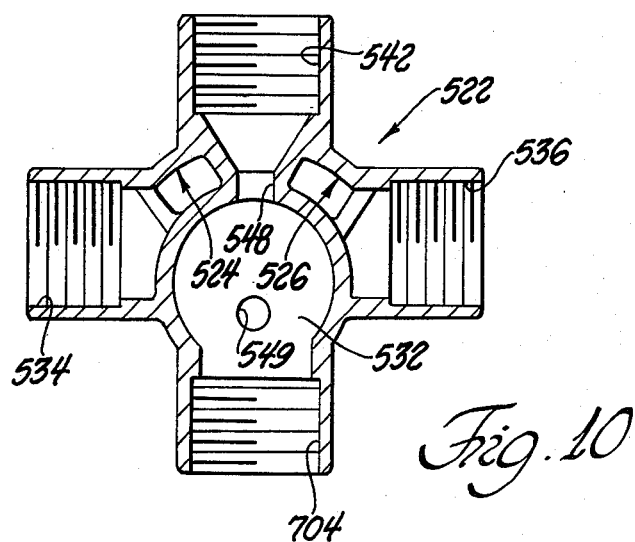
FIG. 10 is a sectional view taken along line 10—10 of FIG. 9.

Referring now to FIGS. 9 and 10, there is shown a second embodiment of the present invention which is similar to the first embodiment of the invention. Therefore, only those parts shown which are different from the parts shown and described in the first embodiment will be described in detail. Furthermore, parts which perform a similar or identical function to the parts shown in the first embodiment will have a reference numeral the same as the reference numeral of the first embodiment but increased by five hundred.

With reference to FIG. 9, a faucet assembly 520 is shown in its off position. The assembly 520 includes a housing generally indicated at 522 which is partially broken away for illustrative purposes.

With reference to FIG. 10, the housing 522 includes hot and cold water inlets 524 and 526, respectively. The housing 522 includes a bore 528 formed therein and defined by an inner wall portion 530 of the housing 522. The hot and cold inlets 524 and 526 include hot and cold water openings 534 and 536, respectively, both of which are threaded to receive hot and cold water pipes (not shown). An opening 549 extends through a base portion 532 of the housing 522 and places the bore 528 in fluid communication with either one of an opening 704 which is threaded to receive a spout (not shown) having a manually operated diverter or a passage 548 and a communicated threaded hole 542 which is thereby adapted to receive a pipe (not shown) which leads to a shower head.

The assembly 520 also includes a control valve generally indicated at 552 substantially identical to the control valve 52 except that its hot water passage 568 and its cold water passage (not shown) are formed through the bottom portion 566 of a sleeve 554 of the control valve 552 and not through the top portion 564 of the sleeve 554. The control valve 552, in fact, substantially comprises the control valve 52 only mounted upside down.

In the embodiment shown in FIG. 9, threaded holes (not shown but similar to holes 196 and 198 of the first embodiment) are formed in the inner wall portion 530 of the housing 522 at bosses 604 and 606 integrally formed therewith. An escutcheon or shield generally indicated at 700 is secured at its upper surface 701 to the bosses 604 and 606 by a pair of screws 703 and 705 which extend through a pair of cylindrical spacers 605 and 607 and also through a valve lid 642, a support member 676, and into the bosses 604 and 606.

Another pair of screws 678 (only one of which is shown) extend from the top surface of the support member 676 therethrough, through the valve lid 642 and into the bosses 604 and 606, to secure the lid 642 and the member 676 to the housing 522 when the escutcheon 700 is removed.

A shaft generally indicated at 618 is substantially identical to the shaft 118 of the first embodiment except one end of the shaft 118 is not formed with flange members similar to the flange members 166 of the first embodiment, but rather, has its outer circumferential surface knurled at 619 for gripping engagement with a handle 621, the shaft 618 extending through a passage 623 in the handle 621 and being secured to the handle 621 by a screw 625 and a washer 627.

The shaft 618 also includes a transverse stop pin 629 which limits rotational movement of the shaft 618 to about 120° of rotational movement by engaging the outer surfaces of the spacers 605 and 607. The valve lid 642 is substantially the same as the valve lid 142 of the first embodiment. Both the support plate 680 and the valve lid 642 are sealed at the inner wall portion 530 by an O-ring 547.

As shown in FIG. 9, the control valve 552 and the handle 621 are shown in the off position. If the handle 621 and the shaft 618 are pulled axially upwardly, the passages (only one of which is shown at 569) in the sleeve 554 of the control valve 552 establish communication with the hot and cold water inlets 524 and 526. The control of the temperature of the mixed water is done in the same way as described in the first embodiment. Mixed water may be diverted from its spout (not shown) and into its attached spray hose or other attachment such as a shower head pipe by controlling the manual diverter contained in the spout.

As previously mentioned, the same control valve 52 can be used in both of the embodiments since the control valve 52 merely need by turned upside down to become the control valve 552.

Also, in both embodiments the seals 76 and 78 (not shown in the second embodiment) may be easily changed by either removing the spout assembly 50 and the plugs 96 and 98 or, in the second embodiment, by removing the shield 700 and its plugs (only one of which is shown at 598).

While the preferred embodiment and another embodiment of the invention have been shown and described herein in detail, those skilled in this art will recognize various alternative designs and embodiments of the present invention as defined by the following claims.

What is claimed is:

1. A mixing valve assembly comprising:
a valve housing closed at one end and open at its opposite end and having a circular bore defined by an inner wall portion, a hot water inlet port, a cold water inlet port circumferentially spaced from the hot water inlet port, and at least one outlet port;
a hollow control valve adapted to be slidably and rotatably mounted in said bore, the control valve including a cylindrical portion having circumferentially spaced passages formed therethrough and extending in a mixing chamber, said control valve having a pair of parallel guide members circumferentially spaced on the inner surface of the control valve and projecting into the mixing chamber,
a valve lid mounted over the open end of said valve housing and overlying the inner wall portion, the valve lid having an aperture formed therethrough and an apertured seal mounted about said aperture,
actuating means comprising a rotatable, slidable and elongated control stem passing through the seal of said apertured valve lid and including a cam engaging said parallel guides for rotating movement; the control stem having a free end disposed in the mixing chamber and having a cylindrical slot extending into the control stem from the free end,
guide means comprising a pin having one end mounted in the closed end of said valve housing and the other end defining a cylindrical stem slidably and rotatably mounted in the cylindrical slot of said control stem,
securing means comprising flanges formed at opposite ends of said cam and engaging said parallel guides for axial movement with said cam wherein axial displacement of said control stem regulates the degree to which the water inlet ports overlap said passages to control the volume of fluid entering the mixing chamber and rotatory movement of said control stem controlling the temperature of the mixed hot and cold water.

2. The assembly as claimed in claim 1 wherein said guide members comprise elongated wall portions integrally formed with said control valve and extending along the longitudinal axis between the top and bottom of the cylindrical portion wherein said flanges on the control stem retain the control valve at the ends of said elongated wall portions.

3. The assembly as claimed in claim 1 wherein the cylindrical portion comprises an integral sleeve of variable thickness.

4. The assembly as claimed in claim 3 wherein the sleeve has a slit extending completely therethrough along the entire longitudinal length of the sleeve.

5. The assembly as claimed in claim 1 or claim 2 wherein the control valve comprises a part reversibly mounted on the control stem between said flanges.

6. The assembly as claimed in claim 1 wherein the cam comprises an eccentric solid having an outer surface tightly engaging the opposing inner surfaces of the parallel guides.

7. The assembly as claimed in claim 1 or claim 2 wherein the longitudinal axis of the control stem and the longitudinal axis of the bore are offset from each other.

8. The assembly as claimed in claim 7 wherein the rotatory movement of the stem about its longitudinal axis produces a reduced rotatory movement of the control valve.

9. The assembly as claimed in claim 1 or claim 3 wherein the inlet ports and passages of the control valve are disposed so that in a first position said inlet ports and said passages are out of registry and the fluid communication is shut off by the outer curved surface portion of the control valve, in a second position said inlets and said passages are in partial registry, both inlets being in fluid communication with the mixing chamber and in a third position, one of the inlets is in full registry with its respective passage and in communication with the mixing chamber and at the same time the other inlet is out of registry with its respective passage, the outer curved portion shutting off communication with the mixing chamber.

10. The assembly as claimed in claim 1 wherein said actuating means includes a fulcrumed lever assembly operatively connected to said control stem to move said control stem in an axial direction and to rotate said control stem within the bore.

11. The assembly as claimed in claim 1 wherein said actuating means include a knob connected to said control stem to move the control stem in an axial direction and to rotate the control stem within the bore.

12. The assembly as claimed in claim 1 wherein said inner wall portion includes at least one axially biased cylindrical seal seated in said inlets and further includes at least one removable plug for accessing said seal, wherein the cylindrical portion slidably contacts the end surface of said cylindrical seal.

13. The assembly as claimed in claim 12 wherein said cylindrical seal includes an axial key portion and said inlet includes a groove portion for receiving said key portion therein, said cylindrical seal being seated in said inlet.

14. The assembly as claimed in claim 1, further including a support member for supporting the assembly and means for securing the support member to a support surface.

15. The assembly as claimed in claim 1 further including a spout assembly in fluid communication with said outlet.

16. The assembly as claimed in claim 15 wherein said spout assembly includes a check valve.

17. The assembly as claimed in claim 1 further including a second valve lid mounted over the first valve lid and having on its outer exterior surface indicia designating rotated and axially moved positions.

* * * * *